United States Patent

[11] 3,603,530

| [72] | Inventors | Roger L. Easton;<br>Charles A. Bartholomew; Robert S. Rovinski, all of Oxon Hill, Md. |
|---|---|---|
| [21] | Appl. No. | 863,457 |
| [22] | Filed | Oct. 3, 1969 |
| [45] | Patented | Sept. 7, 1971 |
| [73] | Assignee | The United States of America as represented by the Secretary of the Navy |

[54] PASSIVE TEMPERATURE CONTROL FOR SATELLITE
9 Claims, 1 Drawing Fig.

[52] U.S. Cl. ............................................. 244/1 SC
[51] Int. Cl. .............................................. B64g 1/00
[50] Field of Search ............................. 244/1 SS, 1 SC, 1 SA, 117 A; 165/135, 136, 146

[56] References Cited
UNITED STATES PATENTS
| 3,295,791 | 1/1967 | Black | 244/1 SC |
| 3,450,372 | 6/1969 | DeLarge et al. | 244/1 SS |
| 3,500,417 | 3/1970 | Adams | 244/1 SS X |

OTHER REFERENCES

NASA Technical Report 32-955; Mariner Mars 1964 Temperature Control Hardware Design and Development; W. Carrol et al.; Jet Propulsion Laboratory; June 1, 1967; pp. 4–5.

*Primary Examiner*—Milton Buchler
*Assistant Examiner*—Jeffrey L. Forman
*Attorneys*—R. S. Sciascia, Arthur L. Branning, R. J. Erickson and J. G. Murray ABSTRACT: An earth-facing satellite having an inner compartment which contains electronic equipment and an outer housing which is heat isolated from and surrounds the inner compartment except on the bottom side of the satellite. Passive control of the ambient temperature of the inner compartment is obtained by heat exchange between the earth and the bottom side of the satellite and by thermal shields which protect the bottom surface from direct solar radiation.

PATENTED SEP 7 1971
3,603,530
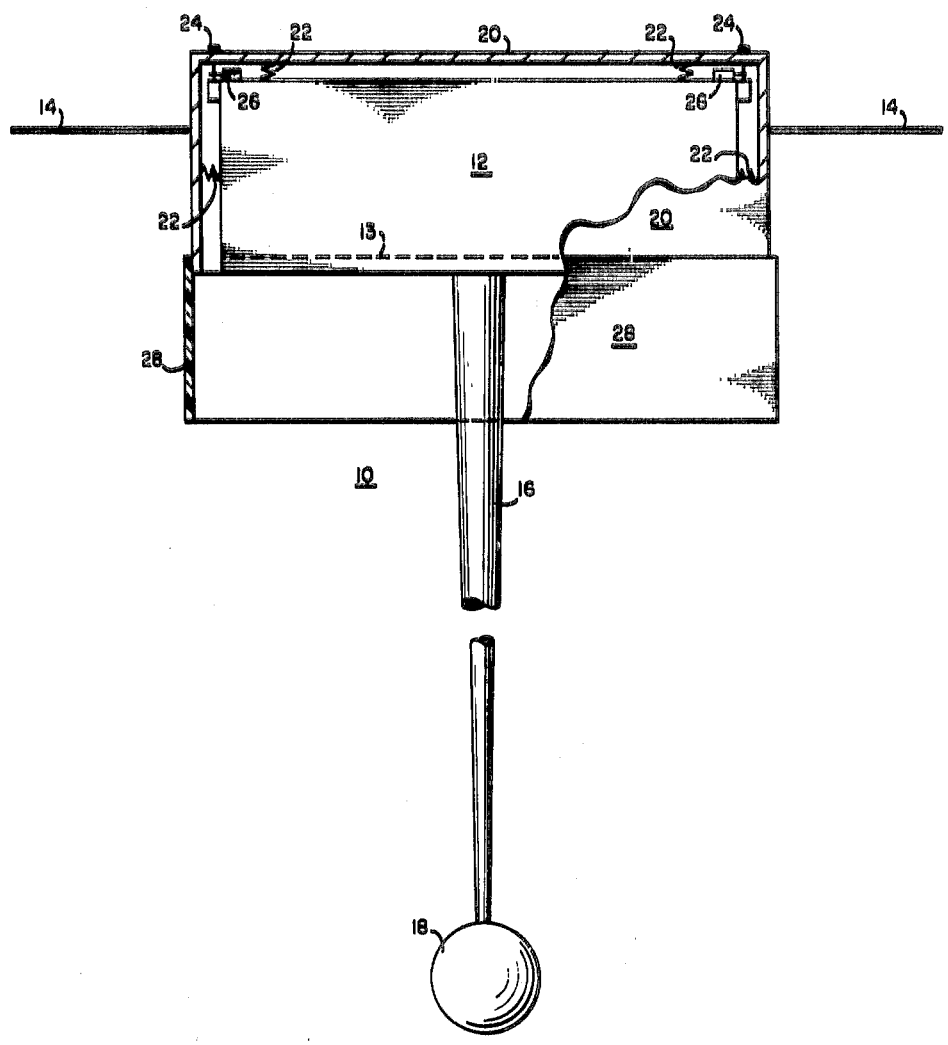
INVENTORS
ROGER L. EASTON
CHARLES A. BARTHOLOMEW
ROBERT S. ROVINSKI
BY
ATTORNEYS

PASSIVE TEMPERATURE CONTROL FOR SATELLITE

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Space satellites are often designed for a specific function. Many are intended to operate as weather observation and/or navigational reference stations, and are accordingly designed to be placed in orbits and to be stabilized with one surface constantly facing the earth. The protection of electronic equipment against large temperature variations is one of the problems associated with the type of satellite described.

Heretofore limiting the ambient temperature excursions of the electronic compartment has been accomplished by using special outer coatings on the satellite and by using venetian blind type shutters that change the emissivity and adsorptivity of certain portions of the satellite. In general, the prior methods have not been entirely satisfactory.

SUMMARY OF THE INVENTION

The present invention provides an improved thermal design for a satellite, such as was previously described. More specifically, the ambient temperature excursion of the electronics compartment is minimized by passive means which include an outer housing that is heat isolated from and surrounds the inner electronics compartment except on the bottom side of the satellite. The bottom side is protected from direct sunlight by shields and is designed to have an area and other characteristics that will set up a balanced heat exchange between the satellite and the earth.

OBJECTS OF THE INVENTION

It is therefore an object of the invention to provide an improved thermal design for a satellite.

Another object is to provide an improved thermal design for a satellite which is always oriented so that one particular side is facing the earth.

A still further object is to provide thermal means that passively limit the ambient temperature variations for an electronic compartment in a satellite which is always oriented so that one particular side is facing the earth.

DESCRIPTION OF THE DRAWING

Other objects and advantages of the invention will hereinafter become more fully apparent from the following description and annexed drawing wherein the sole FIGURE illustrates a preferred embodiment of the invention with near side structure removed to reveal the interior.

DESCRIPTION OF THE PREFERRED EMBODIMENT

Referring now to the drawing which schematically shows a satellite 10 according to the invention. It is contemplated that the satellite 10 would be placed in orbit about the earth. A typical orbit for satellite 10 would be for a minimum sunlight configuration with a period of approximately 104 minutes, an inclination of 70° and a near-circular path approximately 500 nautical miles above the earth's surface.

An electronic compartment 12 is located inside satellite 10 and typically includes top and sides constructed of 1/32-inch thick sheet metal aluminum which preferably has the outer surfaces silver plated and polished and the inner surfaces coated with insulating material, such as ¼-inch thick foamed-in-place Eccofoam. The bottom 13 of compartment 12 can be formed of ½-inch thick aluminum honeycomb suitable for mounting electronic equipments such as precision crystal oscillators, ovens, amplifiers, receivers, transmitters, etc. that function better if the ambient temperature excursion of electronics compartment 12 is minimized.

The proper operation of much of the equipment on satellite 10, including the illustrated directional telemetry antennas 14 and also including such other diverse equipment as cameras, earth aspect sensors, various transducers, etc., which are not illustrated, requires that the bottom of satellite 10 always face toward the earth. That is accomplished by structure which is sensitive to the gravity gradient and includes telescoping boom 16 which carries a weight 18. Typically, the weight 18 may be extended 40 feet from the bottom of satellite 10 by boom 16.

An outer structure or housing 20, preferably made of aluminum and which is illustrated with the near side removed to reveal the interior of satellite 10, is typically spaced 1-inch from and surrounds the electronics compartment 12 on five sides, leaving the bottom panel 13 exposed. The reader will realize that the exterior of structure 20 carries solar panels and diverse sensors and other instrumentation which are not, per se, part of this invention and which are, therefore, not illustrated. The inner surfaces of structure 20 can be silver plated and polished, if desired, to limit radiative heat exchange with compartment 12. As discussed in more detail subsequently, the exposed bottom panel 13 is designed to have an area and other characteristics that set up a balancing heat exchange between the satellite 10 and the earth and thereby minimizes the ambient temperature excursion of the compartment 12.

In addition to very fine wire (low heat conductive) electrical connections, the structure 20 is normally joined to compartment 12 by six springs 22, only four of which are illustrated. During launch and prior to stabilization in orbit, the structure 20 and compartment 12 are clamped by monel holddown studs 24. Upon ground command (after orbit is attained) the studs 24 are sheared by cutters 26, thus leaving compartment 12 and structure 20 connected, primarily by springs 22, i.e. in an uncaged condition. To minimize heat conductance between compartment 12 and structure 20, springs 22 may be made of low-conductivity stainless-steel wire. Radiative interchange between compartment 12 and structure 20 is limited by low-emittance facing surfaces; typically the outside surfaces of compartment 12 and the inside surfaces of structure 12 are silver plated and polished.

The exposed bottom panel 13 of compartment 12 is shielded from direct solar radiation by thermal shields 28 which can be constructed of 1/32-inch thick Melomine plastic and which, if desired for space saving purposes, may be folded during launch. The reader will realize that the near side thermal shield has been omitted from the illustration for the purpose of better showing the boom structure.

Thermal shields 28 also function as radiators for radiant heat interchange. For this reason it is desirable to paint the surfaces of shields 28 with a black paint having high thermal absorptivity and emissivity. It may also be desirable to at least partially paint the lower (exterior) surface of panel 13 with a white paint in order to reduce the absorptance of the satellite to solar reflection from the earth.

The optimum area of panel 13, i.e. the principle heat exchange surface of satellite 10, to give a minimum ambient temperature excursion for the electronics compartment 12 can be calculated, using classical heat exchange theory together with the spatial conditions for an assumed satellite orientation and orbit. Such calculations would typically be made by evaluating thermal models of the stellite, using a computer such as an IBM 7094 or a CDC 3800 and would include consideration of heat sources, such as the electronic equipment in compartment 12, the sun and the earth and heat exchanges in various ways between the different parts of satellite 10 with each other and with space.

In what way may be considered a typical embodiment and usage of the invention, a satellite for navigational purposes was launched and put in orbit by an Agena rocket. During launch and prior to attaining the desired orbit, the boom 16 was retracted, thermal shields 28 were folded in a space saving manner and the compartment 12 and housing 20 were clamped by studs 24. When orbit was attained and upon command from earth, the boom 16 was extended, shields 28 were unfolded into normal position and the studs 24 were sheared by cutters 26. This satellite weighed 85 pounds, being 30 inches in length and 10×17-½ inches in cross section. The passively controlled temperature excursion obtained was between 5 and 30° C. for a 500-nautical-mile near-circular orbit that received minimum sunlight with an inclination of 70° and a period of 104 minutes. The heat exchange surface included 410 square inches.

By now it is apparent that there has been disclosed a satellite which is always oriented so that one particular side is facing the earth and that this side is designed so as to passively limit the ambient temperature variations of an electronic compartment in the satellite. The reader will, of course, understand that the foregoing disclosure relates to only a preferred embodiment of the invention and that numerous modifications, which are obvious to a skilled person from the teachings of this disclosure, are contemplated as being within the scope of the invention.

What is claimed and desired to be secured by Letters Patent of the United States is:

1. A satellite for being placed in orbit around the earth comprising:
    orienting means for keeping one portion of said satellite always pointing toward the earth;
    an outer housing having an opening which always is directed toward the earth and
    inner compartment means, located within said outer housing, for containing temperature sensitive electronic equipment and having a heat exchange side which always faces the earth through said opening in said outer housing, said heat exchange side being so dimensioned that the ambient temperature excursion of said inner compartment means is minimized.

2. The satellite set forth in claim 1 and further including thermal shields which are positioned to substantially shield said outer housing opening from direct solar radiation.

3. The satellite set forth in claim 1 wherein said orienting means includes a telescoping boom with a weight attached to the end thereof.

4. The satellite set forth in claim 1 and further including locating means for suspending said inner compartment means within said outer housing, said locating means comprising:
    springs attached to the inner surfaces of said outer housing and to the outer surfaces of said inner compartment means;
    studs rigidly connecting said outer housing and said inner compartment means and
    cutting means for shearing said studs upon remote command.

5. The satellite set forth in claim 1 wherein the facing surfaces of said outer housing and said inner compartment means are silver plated and polished to minimize the radiative interchange of heat between said outer housing and said inner compartment means.

6. The satellite set forth in claim 2 wherein said thermal shields are black.

7. A satellite for being placed in orbit around the earth comprising:
    orienting means including a telescoping boom with a weight attached to the end thereof for keeping one portion of said satellite always pointing toward the earth;
    an outer housing having an opening which always is directed toward the earth and including thermal shields which are positioned to substantially shield said outer housing opening from direct solar radiation and
    inner compartment means, located within said outer housing, for containing electronic equipment and having a heat exchange side which always faces the earth through said opening in said outer housing, said heat exchange side being so dimensioned that the ambient temperature excursion of said inner compartment means is minimized.

8. A satellite as set forth in claim 7 and further including locating means for suspending said inner compartment means within said outer housing, said locating means comprising:
    springs attached to the inner surfaces of said outer housing and to the outer surfaces of said inner compartment means;
    studs rigidly connecting said outer housing and said inner compartment means and
    cutting means for shearing said studs upon remote command.

9. A satellite as set forth in claim 8 wherein said thermal shields are black and wherein the facing surfaces of said outer housing and said inner compartment means are silver plated and polished to minimize the radiative interchange of heat between said outer housing and said inner compartment means.